United States Patent
Teramoto et al.

(10) Patent No.: US 11,787,089 B2
(45) Date of Patent: Oct. 17, 2023

(54) METHOD OF PRODUCING AN OPTICAL MEMBER INCLUDING AN ALIGNMENT OF CANES INTO A JIG

(71) Applicant: Sony Group Corporation, Tokyo (JP)

(72) Inventors: Ryoichi Teramoto, Kanagawa (JP); Atsuyoshi Ichihashi, Aichi (JP)

(73) Assignee: Sony Group Corporation

( * ) Notice: Subject to any disclaimer, the term of this patent is extended or adjusted under 35 U.S.C. 154(b) by 137 days.

(21) Appl. No.: 17/317,213

(22) Filed: May 11, 2021

(65) Prior Publication Data
US 2021/0354334 A1    Nov. 18, 2021

(30) Foreign Application Priority Data

May 15, 2020 (JP) ................. 2020-086158

(51) Int. Cl.
*B29C 31/08* (2006.01)
*B29C 31/00* (2006.01)
*B29L 11/00* (2006.01)

(52) U.S. Cl.
CPC ............ *B29C 31/08* (2013.01); *B29C 31/008* (2013.01); *B29L 2011/00* (2013.01)

(58) Field of Classification Search
CPC .......... B23Q 3/00; B65D 53/00; B65G 1/00; B29C 71/0009; B29C 2033/727; B29C 2045/14868; B29C 49/4282; B29C 64/35; B29C 66/0222; B29C 66/876; B29C 2948/92342; B08B 3/00; B29D 11/00721; B29D 11/0048; B29D 11/00451; B29L 2011/0075
See application file for complete search history.

(56) References Cited

U.S. PATENT DOCUMENTS

| 2003/0190130 A1 * | 10/2003 | Welker ................. G02B 6/3885 264/1.29 |
| 2022/0236487 A1 * | 7/2022 | Tetsuka ................ G02B 6/2938 |

FOREIGN PATENT DOCUMENTS

| CN | 203486581 U | * 3/2014 | |
| FR | 2557495 A1 | * 7/1985 | ....... B29D 11/00721 |
| JP | 2009286089 A | * 12/2009 | |

OTHER PUBLICATIONS

English translation of FR2557495A1 retrieved from espacenet on Nov. 14, 2022 (Year: 2022).*
English translation of JP-2009286089-A retrieved from espacenet on Nov. 14, 2022 (Year: 2022).*
English translation of CN-203486581-U retrieved from espacenet on Nov. 14, 2022 (Year: 2022).*

* cited by examiner

*Primary Examiner* — Francisco W Tschen
*Assistant Examiner* — Elisa H Vera
(74) *Attorney, Agent, or Firm* — Lerner David LLP

(57) ABSTRACT

An information processing apparatus includes a presentation processing unit. The presentation processing unit executes, when a specific sound is generated at another point other than one of a plurality of points, presentation processing for presentation indicating that the specific sound generated at the other point is not a sound generated at the one point. Each of the plurality of points has a telepresence apparatus constituting a telepresence system that performs bidirectional communication of images and sounds for communication between users located at the plurality of points.

9 Claims, 21 Drawing Sheets

Part A
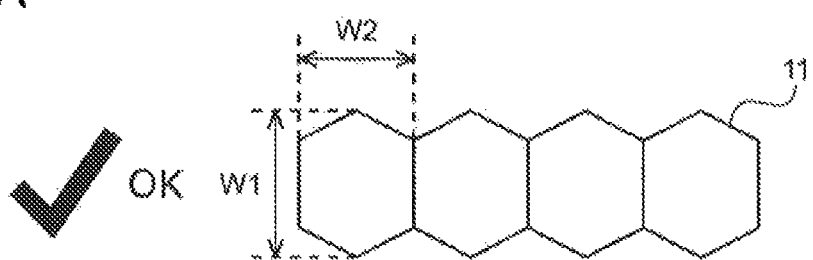
Part B
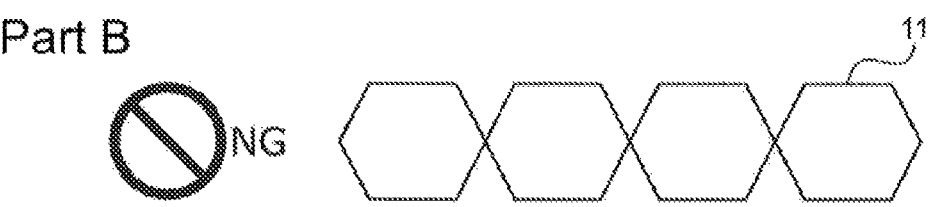
Part C
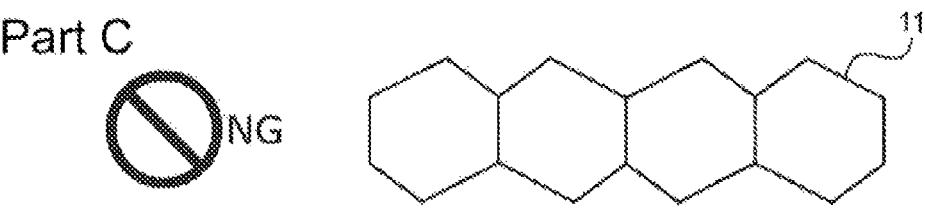
FIG. 2

Part A
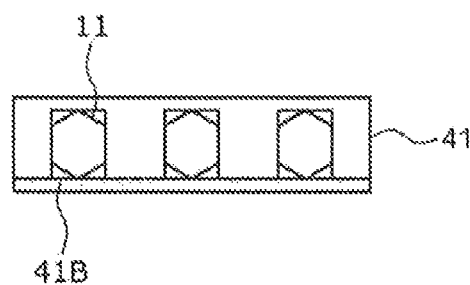
Part B
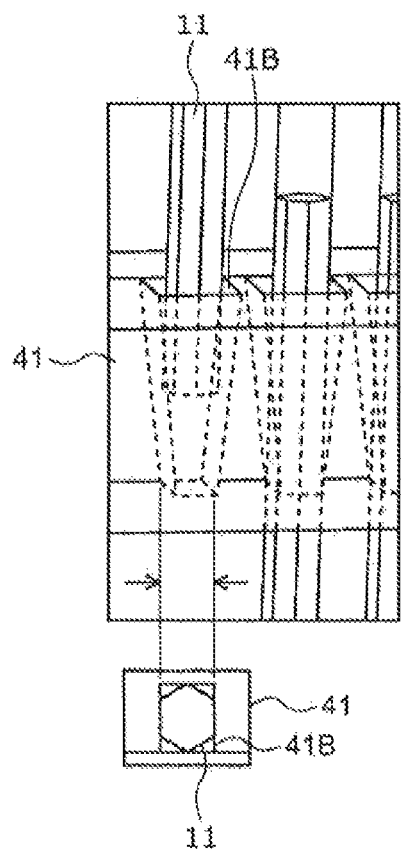
FIG. 5

METHOD OF PRODUCING AN OPTICAL MEMBER INCLUDING AN ALIGNMENT OF CANES INTO A JIG

CROSS REFERENCE TO RELATED APPLICATIONS

This application claims the benefit of Japanese Priority Patent Application JP 2020-086158 filed May 15, 2020, the entire contents of which are incorporated herein by reference.

BACKGROUND

The present technology relates to a method of producing an optical member, a jig, an alignment apparatus, and a packing apparatus, and particularly to a method of producing an optical member, a jig, an alignment apparatus, and a packing apparatus that are suitably used in the case of producing an optical member using a cane.

In the past, columnar canes have been used for producing LGPs (Light Guiding Panels). For example, after canes have been generated by a cane producing apparatus, a cage containing a large number of canes is placed in a cleaning apparatus, and the canes are cleaned. The cleaned canes are then manually aligned in a mold in the horizontal direction and the vertical direction. Next, the mold in which the canes are aligned is placed in a furnace, and the canes are melted, thereby generating an ingot that is a rectangular parallelepiped optical member. Then, an LGP is produced by using the ingot.

SUMMARY

However, in the case of the above-mentioned production method, since the canes are cleaned in a state in which the canes are dense, there is a possibility that dust and stains adhering to the cane are not completely removed. In addition, for example, since 10,000 or more canes are aligned in a mold, in the case where the canes are manually operated, the work time becomes long and errors tend to occur. In addition, there is a high possibility of dust and stains adhering during the work. As a result, there is a possibility that the quality of the LGP deteriorates.

The present technology has been made in view of the above-mentioned circumstances and it is an object thereof to improve the quality of an optical member using a cane.

Solution to Problem

A method of producing an optical member according to a first aspect of the present technology includes:

an alignment step of inserting, by an alignment apparatus, one columnar cane into each of a plurality of insertion holes of a jig, the plurality of insertion holes being aligned at predetermined intervals in a first direction and extending in a second direction perpendicular to the first direction, the jig holding the respective canes inserted into the plurality of insertion holes;

a cleaning step of cleaning, by a cleaning apparatus, the respective canes aligned in the jig; and a packing step of repeatedly performing, by a packing apparatus, a process of inserting the cleaned cane into a mold from the jig and aligning the canes in the mold in a horizontal direction and a vertical direction.

A jig according to a second aspect of the present technology includes: a first support member in which a plurality of insertion holes that is aligned at predetermined intervals in a first direction and extends in a second direction perpendicular to the first direction is formed, the first support member supporting a side surface of a columnar cane inserted into each of the insertion holes; and a second support member that supports a bottom surface of each of the canes passing through the respective insertion hole.

An alignment apparatus according to a third aspect of the present technology includes: a gripping mechanism that grips a columnar cane; a moving mechanism that moves the gripping mechanism; and a holding mechanism that holds a jig holding the canes inserted one by one into a plurality of insertion holes of the jig, the plurality of insertion holes being aligned at predetermined intervals in a first direction and extending in a second direction perpendicular to the first direction, in which the moving mechanism moves the gripping mechanism and moves the cane to a position of the insertion hole of the jig, and the gripping mechanism inserts the cane into the insertion hole.

A packing apparatus according to a fourth embodiment of the present technology includes: a moving mechanism that moves at least one of a jig or a mold and adjusts a relative position between the jig and the mold, a plurality of columnar canes being horizontally aligned in parallel with each other at intervals substantially equal to a width of the cane; and a pushing mechanism that pushes out the plurality of canes aligned in the jig at a time and inserts the canes into the mold at intervals of one cane, in which the canes are aligned in the mold in a horizontal direction and a vertical direction by repeating a process of inserting the plurality of canes into the mold from the jig for a plurality of the jigs by the pushing mechanism while adjusting the relative position between the jig and the mold by the moving mechanism.

In the first aspect of the present technology, one columnar cane is inserted into each of a plurality of insertion holes of a jig, the plurality of insertion holes being aligned at predetermined intervals in a first direction and extending in a second direction perpendicular to the first direction, the jig holding the respective canes inserted into the plurality of insertion holes, the respective canes aligned in the jig are cleaned, a process of inserting the cleaned cane into a mold from the jig is repeated for a plurality of jigs, and the canes are aligned in the mold in a horizontal direction and a vertical direction.

In the second aspect of the present technology, a plurality of insertion holes extending in a second direction perpendicular to the first direction is formed, a side surface of a columnar cane inserted into each of the insertion holes is supported, and a bottom surface of each of the canes passing through the respective insertion hole is supported.

In the third aspect of the present technology, one columnar cane is inserted into each of a plurality of insertion holes of a jig, the plurality of insertion holes being aligned at predetermined intervals in a first direction and extending in a second direction perpendicular to the first direction, the jig holding the respective canes inserted into the plurality of insertion holes.

In the fourth aspect of the present technology, a plurality of columnar canes being horizontally aligned in parallel with each other at intervals substantially equal to a width of the cane, and the canes are aligned in the mold in a horizontal direction and a vertical direction by repeating a process of inserting the plurality of canes into the mold from the jig for a plurality of the jigs while adjusting the relative position between the jig and the mold.

These and other objects, features and advantages of the present disclosure will become more apparent in light of the

BRIEF DESCRIPTION OF DRAWINGS

FIG. 2 is a diagram showing an example of how to align canes;

FIG. 5 is a diagram showing a configuration example of an insertion hole of the cassette;

DETAILED DESCRIPTION OF EMBODIMENTS

Hereinafter, an embodiment for carrying out the present technology (hereinafter, referred to as an embodiment) will be described. Description will be made in the following order.

1. Embodiment
2. Modified example
3. Others

1. Embodiment

Hereinafter, an embodiment of the present technology will be described.

Configuration Example of Cane 11

First, a configuration example of a cane 11 generated by the present technology will be described with reference to FIG. 1.

The cane 11 is formed of, for example, a resin such as polystyrene and acrylic, and is a member of a hexagonal prism used for producing LGPs.

The bottom surface of the cane 11 is a hexagon whose inner angles are all equal in size similarly to a regular hexagon, one set of sides of three sets of sides of the bottom surface parallel to each other being longer than the other two sets of sides. Specifically, sides BC and EF parallel to each other are longer than sides AB and DE parallel to each other and sides CD and FA parallel to each other. The lengths of the sides AB and DE and the lengths of the sides CD and FA are all equal to each other. For this reason, of the diagonals passing through the center of the bottom surface, a diagonal AD is longer than a diagonal BE and a diagonal CF. Further, the lengths of the diagonal BE and the diagonal CF are equal to each other.

Note that, for example, the length of the diagonal AC is 2.39 mm, the length of the diagonal CE is 2.3 mm, and the length of the diagonal AD is 2.8 mm. Further, for example, the length of the cane 11 is 150 mm.

As will be described below, the canes 11 are aligned in a honeycomb pattern in a mold without gaps in the horizontal direction and the vertical direction. At this time, as shown in Part A of FIG. 2, the canes 11 are aligned so that the long sides (the side BC and the side EF in FIG. 1) are adjacent to each other.

In the case of other alignment, for example, in the case of aligning the canes 11 as shown in Parts B and C of FIG. 2, the canes 11 cannot be aligned without gaps.

Note that hereinafter, as shown in Part A of FIG. 2, the width in the vertical direction of the bottom surface in the case of aligning the canes 11 without gaps is represented by W1, and the width in the horizontal direction is represented by W2. The width W1 is equal to the length of the diagonal AD of the bottom surface of the cane 11, and the width W2 is equal to the length of the diagonal BF and the diagonal CE.

As will be described below, the canes 11 aligned in a honeycomb pattern in the mold are put into a furnace and melted, and thus, an ingot that is a rectangular parallelepiped optical member is generated. This ingot is used to produce LGPs.

Configuration Example of Cassette 31

Next, a configuration example of a cassette 31 to which the present technology is applied will be described with reference to FIG. 3 to FIG. 5. The cassette 31 is a jig that holds the canes 11 in an aligned state.

Figure 3:
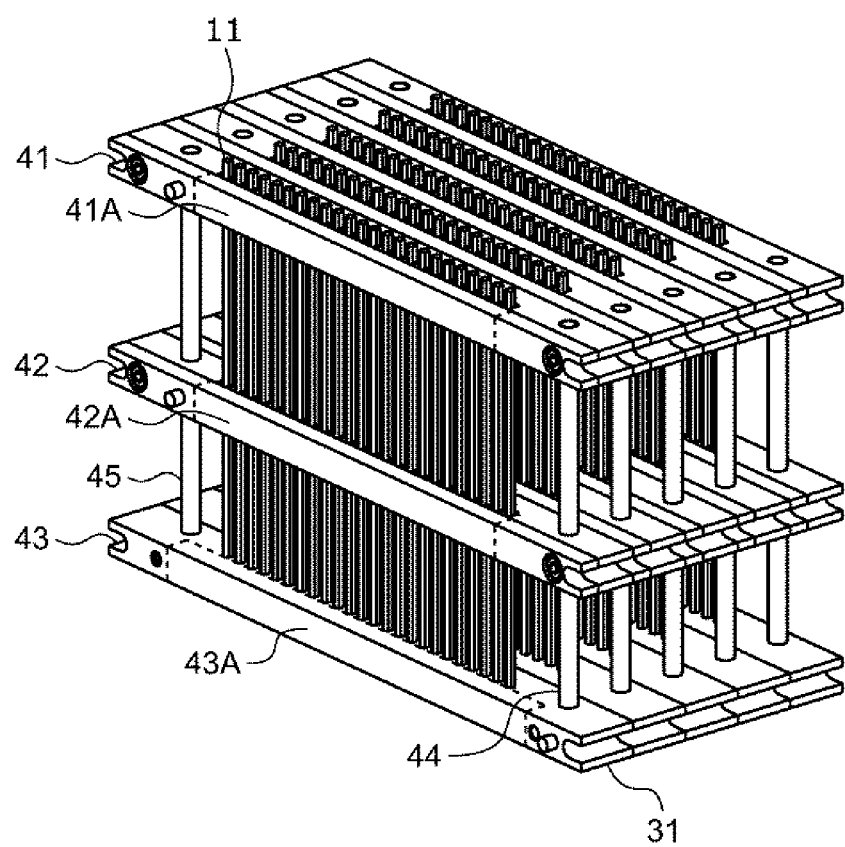
FIG. 3 is a perspective view showing a configuration example of a cassette to which the present technology is applied.
Figure 4:
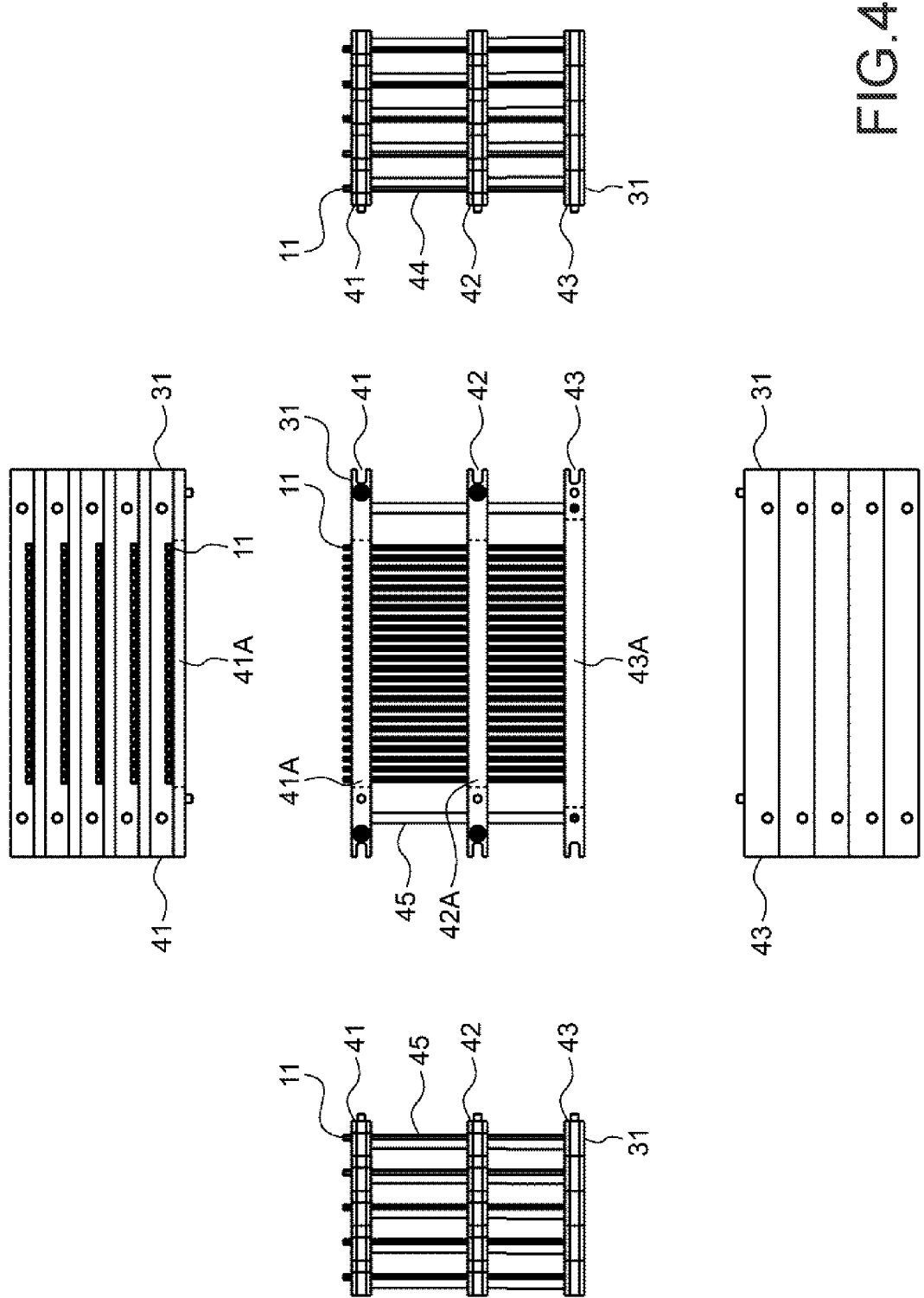
FIG. 4 is a front view, a plan view, a bottom view, a left side view, and a right side view showing a configuration example of the cassette to which the present technology is applied.

FIG. 3 and FIG. 4 show a configuration example of a cassette group in which five cassettes 31 are coupled to each other. FIG. 3 is a perspective view of the cassette group.

FIG. 4 shows a front view, a left side view, a right side view, a plan view, and a bottom view of the cassette group.

Note that in FIG. 3 and FIG. 4, some of reference numerals are omitted for the sake of clarity.

Further, hereinafter, the vertical direction in the front view of FIG. 4 will be defined as the up-and-down direction or the height direction of the cassette 31, and the horizontal direction will be defined as the right-and-left direction or the width direction of the cassette 31. Further, the vertical direction in the top view of FIG. 4 is defines as the front-rear direction or the depth direction of the cassette 31.

The cassette 31 includes a support member 41, a support member 42, a bottom plate 43, a coupling member 44, and a coupling member 45. The support member 41, the support member 42, the bottom plate 43, the coupling member 44, and the coupling member 45 are each, for example, a metallic or resinous member.

The support member 41, the support member 42, and the bottom plate 43 extend in the horizontal direction at predetermined intervals and are coupled to each other via the cylindrical coupling member 44 and the cylindrical coupling member 45. The coupling member 44 and the coupling member 45 extend in the up-and-down direction in the vicinity of both ends in the horizontal direction of the support member 41, the support member 42, and the bottom plate 43.

FIG. 5 is an enlarged view of a part of the support member 41. Part A of FIG. 5 shows a part of the bottom surface of the support member 41. Part B of FIG. 5 is a perspective view of a part of the support member 41.

In the support member 41, insertion holes 41B extending (penetrating) in the up-and-down direction are formed at predetermined intervals in the right and left direction.

The opening of the insertion hole 41B at the bottom of the support member 41, i.e., the opening of the terminal (hereinafter, referred to as the terminal opening) of the insertion hole 41B in the direction in which the cane 11 is inserted (hereinafter, referred to as the insertion direction) has a rectangular shape having a size matched to the outer periphery of the bottom surface of the cane 11. Specifically, the width of the terminal opening in the right-and-left direction is substantially equal to the width W2 (FIG. 1) of the bottom surface of the cane 11, and the width in the front-rear direction is substantially equal to the width W1 (FIG. 1) of the bottom surface of the cane 11. Further, the interval between the adjacent terminal openings is substantially equal to the width W2 of the bottom surface of the cane 11.

Meanwhile, the opening of the insertion hole 41B in the upper surface of the support member 41, i.e., the opening of the start-edge (hereinafter, referred to as the start-edge opening) of the insertion hole 41B in the insertion direction is larger than the terminal opening. Specifically, the width of the start-edge opening in the right-and-left direction is longer than the width of the terminal opening in the right-and-left direction. Meanwhile, the width of the start-edge opening in the front-rear direction is equal to the width of the terminal opening in the front-rear direction.

Thus, the insertion hole 41B is tapered as advancing in the insertion direction of the cane 11. That is, the right and left walls of the insertion hole 41B have a tapered shape, and the front and rear walls rise steeply in the vertical direction. Therefore, the width of the right and left of the insertion hole 41B is narrower as advancing in the insertion direction of the cane 11.

Note that also insertion holes 42B (not shown) of the support member 42 each have a shape similar to that of the insertion hole 41B of the support member 41. Further, the insertion holes 42B of the support member 42 are disposed so as to overlap the respective insertion holes 41B of the support member 41 in the up-and-down direction.

Then, the support member 41 and the support member 42 respectively support the side surface of the cane 11 inserted into each of the insertion holes 41B and each of the insertion holes 42B.

The bottom plate 43 is a support member that supports the bottom surface of the cane 11 inserted into the support member 41 and the support member 42.

Further, although not shown, the surface of the bottom plate 43 that supports the bottom surface of the cane 11 is meshed. As a result, in a cleaning step described below, water or a cleaning agent passes through a mesh-like portion of the bottom plate 43, and the bottom surface of the cane 11 or the like can be prevented from being uncleaned.

Then, by inserting one cane 11 into each of the insertion holes 41B and each of the insertion holes 42B of the cassette 31, the plurality of canes 11 is aligned in parallel with each other at predetermined intervals, and is held in an aligned state.

More specifically, since the terminal openings of the insertion hole 41B and the insertion hole 42B each have a shape matched to the bottom surface of the cane 11, the direction in which the cane 11 is inserted into the circumferential direction is aligned (limited). Further, the interval between the terminal openings of the adjacent insertion holes 41B and the interval between the terminal openings of the adjacent insertion holes 41B are each substantially equal to the width W2 of the bottom surface of the cane 11. Therefore, by inserting one cane 11 into each of the insertion holes 41B and each of the insertion holes 42B of the cassette 31, the plurality of canes 11 is aligned so as to face in a predetermined direction (the diagonal AD of the bottom surface of the cane 11 faces the front-rear direction) and to be parallel to each other in the right-and-left direction at intervals corresponding to one cane 11 (intervals of the width W2 of the bottom surface of the cane 11).

Further, since the start-edge opening of the insertion hole 41B and the insertion hole 42B is larger than the terminal opening, it is easier to insert the cane 11 into the insertion hole 41B and the insertion hole 42B. That is, it is easier to set the cane 11 into the cassette 31.

Note that, for example, the width in the front-rear direction of the start-edge opening of each of the insertion hole 41B and the insertion hole 42B may be wider than the width of the terminal opening in the front-rear direction.

Further, as shown in FIG. 3 and FIG. 4, the cassette 31 can be coupled to or separated from each other in the front-read direction (depth direction).

Further, a plate 41A indicated by a dotted line, which is a part of the front surface of the support member 41, and a plate 42A indicated by a dotted line, which is a part of the front surface of the support member 42, are attachable/detachable. Further, a movable part 43A indicated by a dotted line, which is a part of the front surface of the bottom plate 43, can be moved in the front-rear direction. By moving the movable part 43A, the bottom plate 43 is deformed.

Then, the plate 41A and the plate 42A are removed and the movable part 43A is depressed to expose a part of the side surface of the cane 11 from the insertion hole 41B and the insertion hole 42B and a part of the bottom surface of the cane 11 from the bottom plate 43. As a result, the cane 11 can be pushed out from the bottom surface of the cane 11 in the longitudinal direction of the cane 11 (in the up-and-down direction of the cassette 31).

Note that, hereinafter, a state in which the plate 41A and the plate 42A of the cassette 31 are removed and the movable part 43A is depressed will be referred to as a cane-movable state.

<Process of Producing Optical Member>

Figure 6:
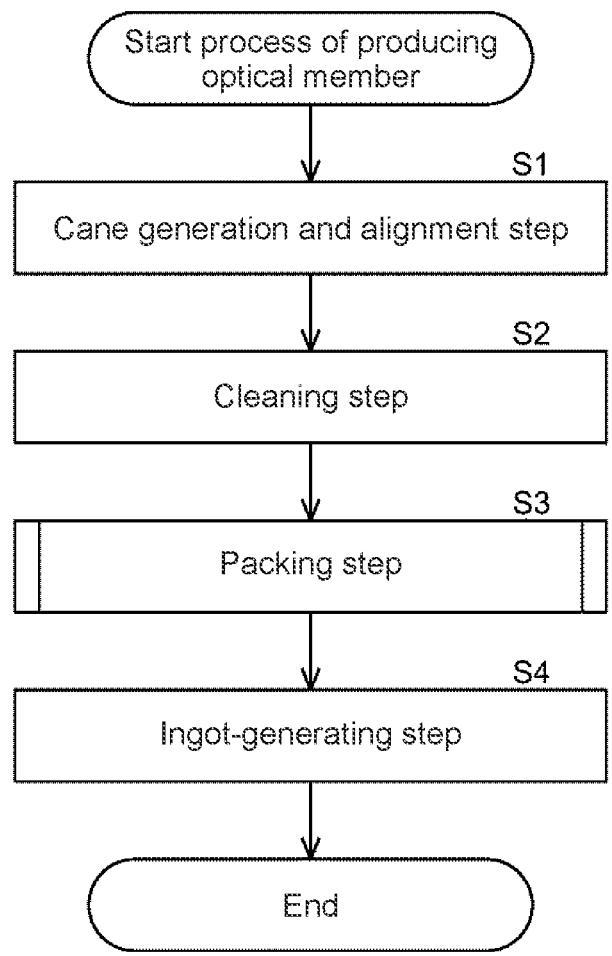
FIG. 6 is a flowchart for describing a process of producing an optical member.

Next, a process of producing an optical member will be described with reference to the flowchart of FIG. 6.

In Step S1, a cane generation and alignment step is performed.

First Embodiment of Cane Generation and Alignment Step

First, a first embodiment of the cane generation and alignment step will be described with reference to FIG. 7 to FIG. 10.

Figure 7:
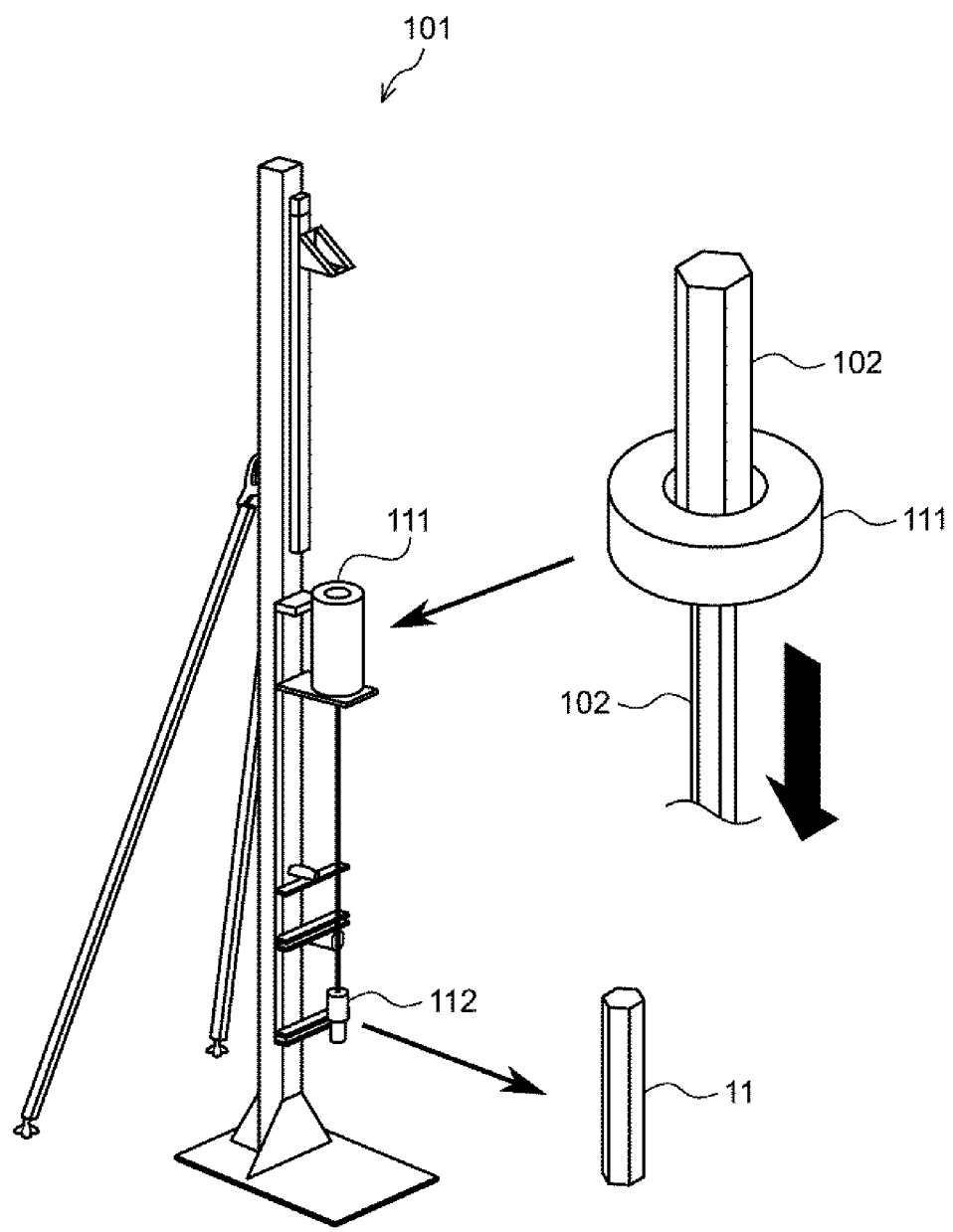
FIG. 7 is a perspective view showing a configuration example of a draw tower.

FIG. 7 shows an example of a draw tower 101 that is an existing cane producing apparatus.

The draw tower 101 includes a melting furnace 111 and a cutter 112.

A long rod-shaped member 102 from which the cane 11 is formed is inserted into the melting furnace 111, and the cross-section of the inserted member 102 is molded into the same shape as the bottom surface of the cane 11.

The molded member 102 is inserted into the cutter 112, and the cutter 112 generates the cane 11 cutting the member 102 for each predetermined length.

Figure 8:
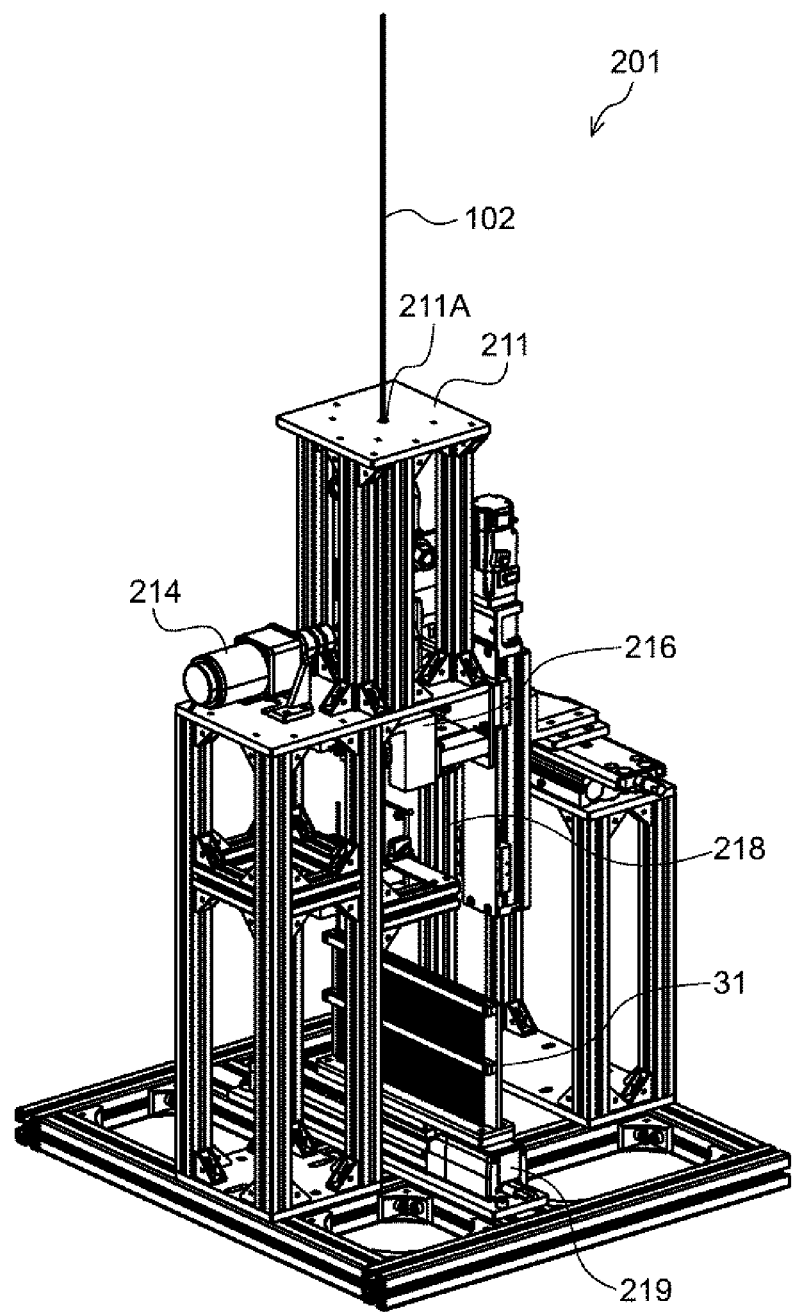
FIG. 8 is a perspective view showing a configuration example of an automatic alignment mechanism of an alignment apparatus to which the present technology is applied.
Figure 9:
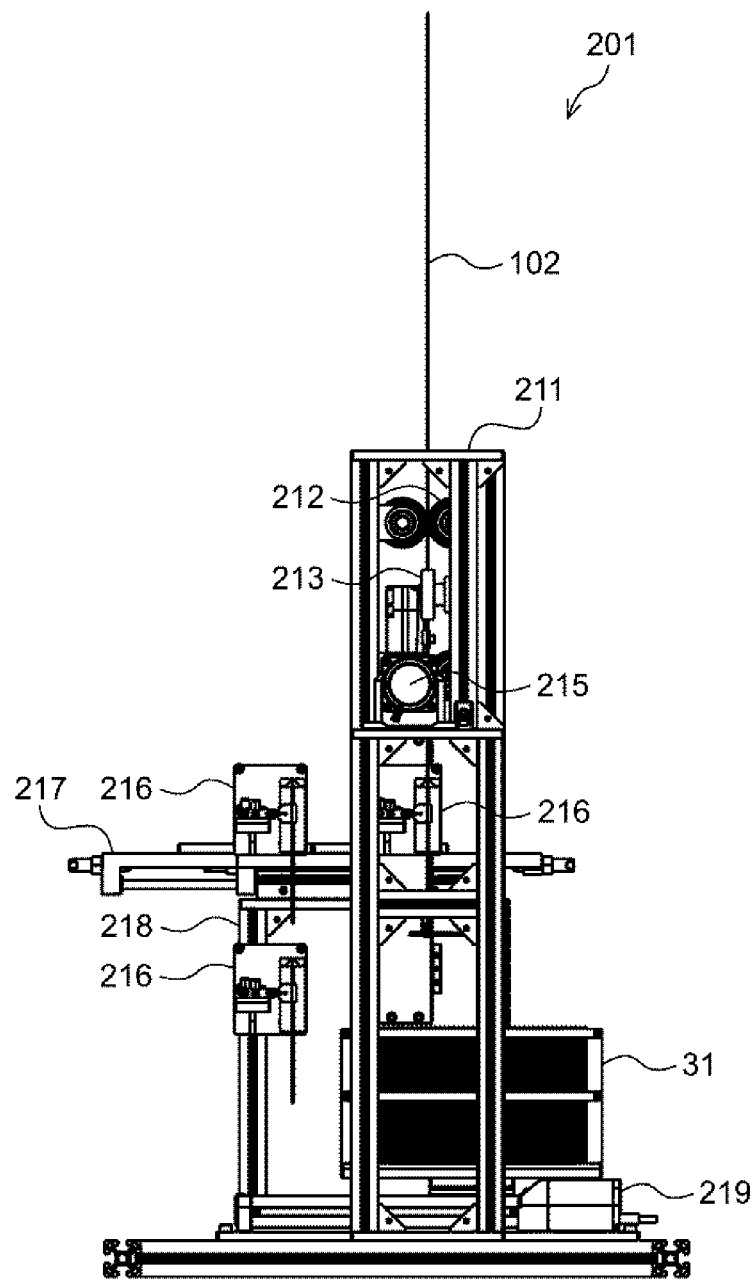
FIG. 9 is a front view showing a configuration example of an automatic alignment mechanism of the alignment apparatus to which the present technology is applied.
Figure 10:
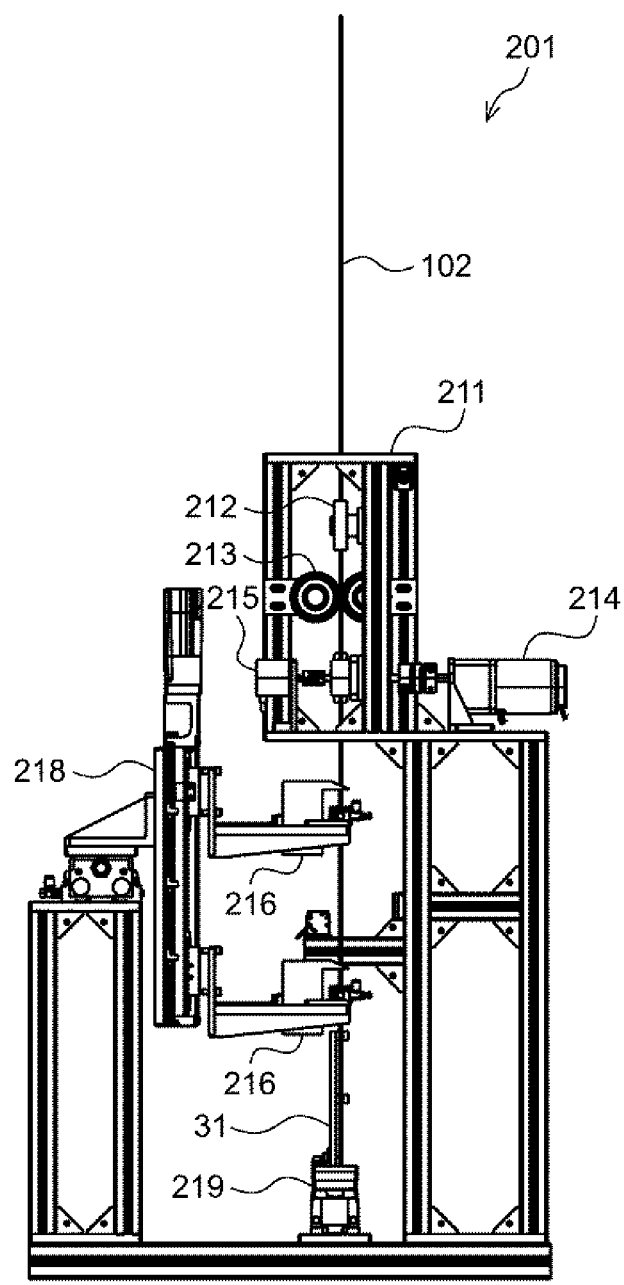
FIG. 10 is a right side view showing a configuration example of the automatic alignment mechanism of the alignment apparatus to which the present technology is applied.

Here, the alignment apparatus to which the present technology is applied has a configuration in which, for example, an automatic alignment mechanism 201 shown in FIG. 8 to FIG. 10 is combined with the portion of the draw tower 101 below the melting furnace 111.

FIG. 8 is a perspective view of the automatic alignment mechanism 201, FIG. 9 is a front view of the automatic alignment mechanism 201, and FIG. 10 is a right side view of the automatic alignment mechanism 201.

the member 102 whose cross-section is molded by the melting furnace 111 of the draw tower 101 is inserted into the automatic alignment mechanism 201 from an insertion hole 211A of a top surface 211.

A roller 212 and a roller 213 are driven by a cane feed motor 214 and an encoder 215 to support the member 102 inserted from the insertion hole 211A and feed the member 102 downward.

A cut unit 216 that is a gripping mechanism grips the member 102 in a predetermined circumferential direction so that the member 102 does not rotate, and cuts the member 102 for each predetermined length, thereby generating the cane 11.

Further, the cut unit 216 is movable in the horizontal direction (hereinafter, referred to as the X-direction) and the vertical direction (hereinafter, referred to as the Z-direction) while gripping the cane 11 by a guide mechanism 217 in the X-direction and a guide mechanism 218 in the Z-direction.

Note that although a plurality of cut units 216 is illustrated in FIG. 9 and FIG. 10 to indicate the moving range of the cut unit 216, the actual number of the cut units 216 is one.

The cassette 31 is held in an upright posture by a holding mechanism 219 and is movable in the X-direction.

Then, by combining the movement of the cut unit 216 in the X-direction and the Z-direction by the guide mechanism 217 and the guide mechanism 218 and the movement of the cassette 31 in the X-direction by the holding mechanism 219, the cane 11 gripped by the cut unit 216 is moved to the position of the insertion hole 41B of the cassette 31 and inserted into the insertion hole 41B. Then, by releasing the cane 11 gripped by the cut unit 216, the cane 11 is set in the cassette 31.

In this way, a process of cutting, by the cut unit 216, the member 102 to generate the cane 11, moving while gripping the cane 11 under the control of the guide mechanism 217 and the guide mechanism 218, and inserting the canes 11 one by one into the insertion holes 41B of the cassette 31 aligned by the holding mechanism 219 is repeated. As a result, the plurality of canes 11 is set in the cassette 31 and aligned at predetermined intervals.

Note that, for example, the cane 11 may be inserted into each of the insertion holes 41B of the cassette 31 by moving only the cut unit 216 while fixing the position of the cassette 31.

Second Embodiment of Cane Generation and Alignment Step

Next, a second embodiment of the cane generation and alignment step will be described with reference to FIG. 11 to FIG. 15.

First, the above-mentioned draw tower 101 in FIG. 7 is used to generate the canes 11.

Figure 11:
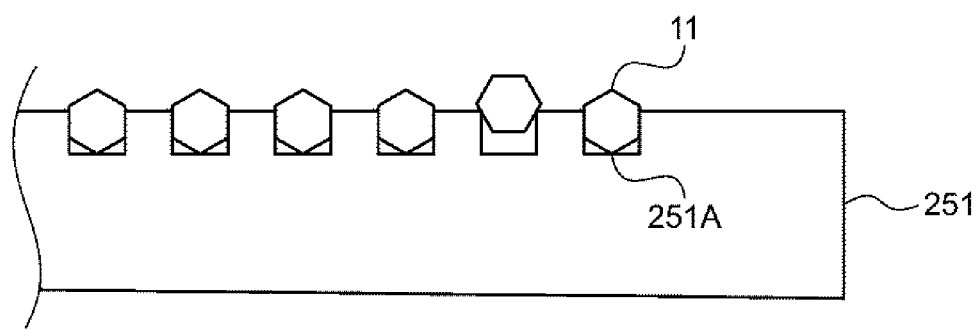
FIG. 11 is a schematic diagram showing a configuration example of a palette.

Next, a commercially available alignment apparatus (not shown) is used to align the canes 11 in a palette 251 as shown in FIG. 11.

Here, grooves 251A are formed at predetermined intervals on the upper surface of the palette 251. The width of the groove 251A is substantially equal to the width W2 (FIG. 1) of the bottom surface of the cane 11. Further, the interval between the adjacent grooves 251A is substantially equal to the width W2 of the bottom surface of the cane 11. Therefore, the plurality of canes 11 is inserted into the grooves 251A in the posture shown in Part A of FIG. 2 described above, and is aligned in the palette 251 at intervals corresponding to one cane 11 (intervals of the widths W2 of the bottom surface of the cane 11).

The canes 11 aligned in the palette 251 are inserted into the cassette 31 using an alignment apparatus 301.

Figure 12:
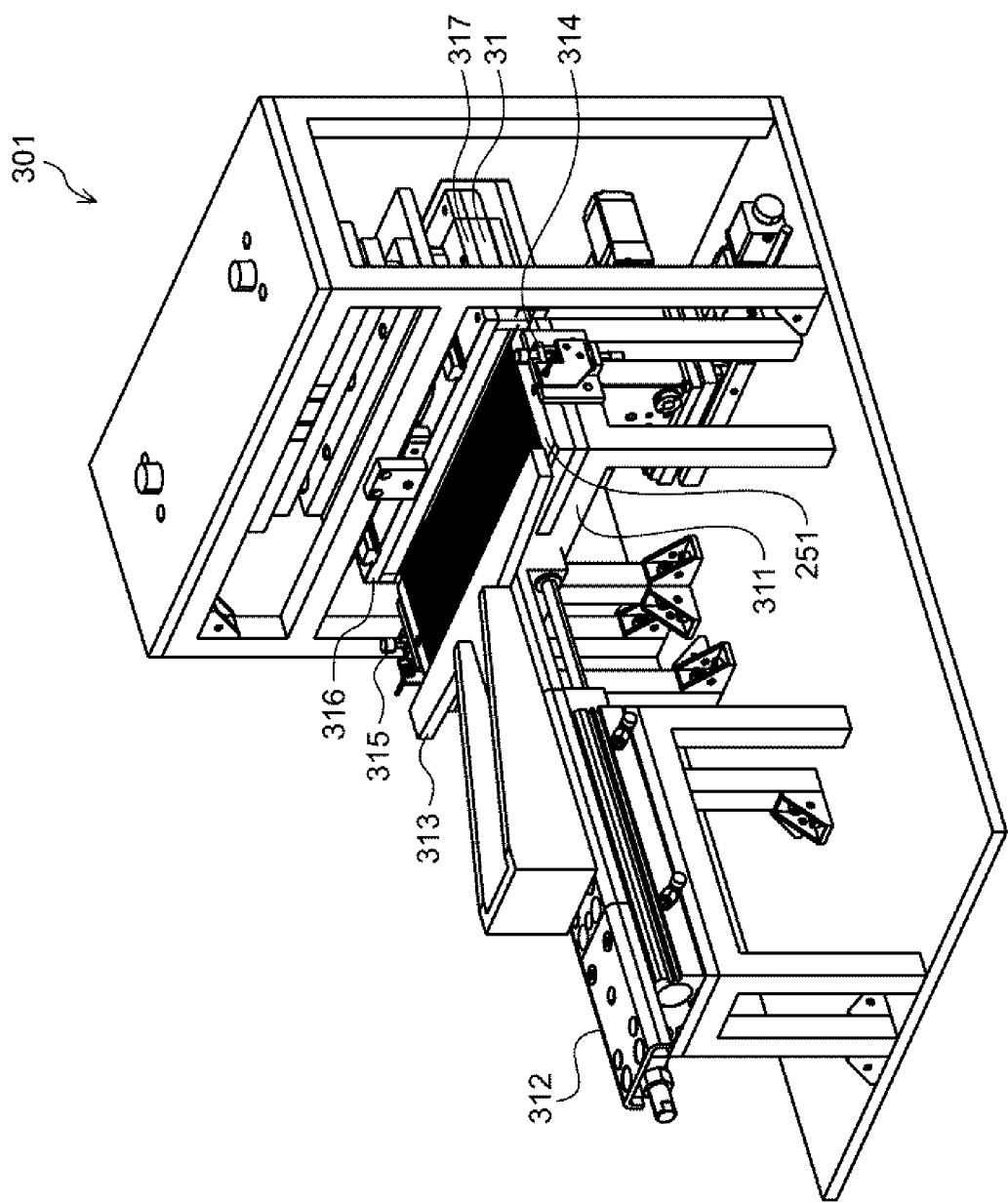
FIG. 12 is a perspective view showing a configuration example of the alignment apparatus to which the present technology is applied.
Figure 13:
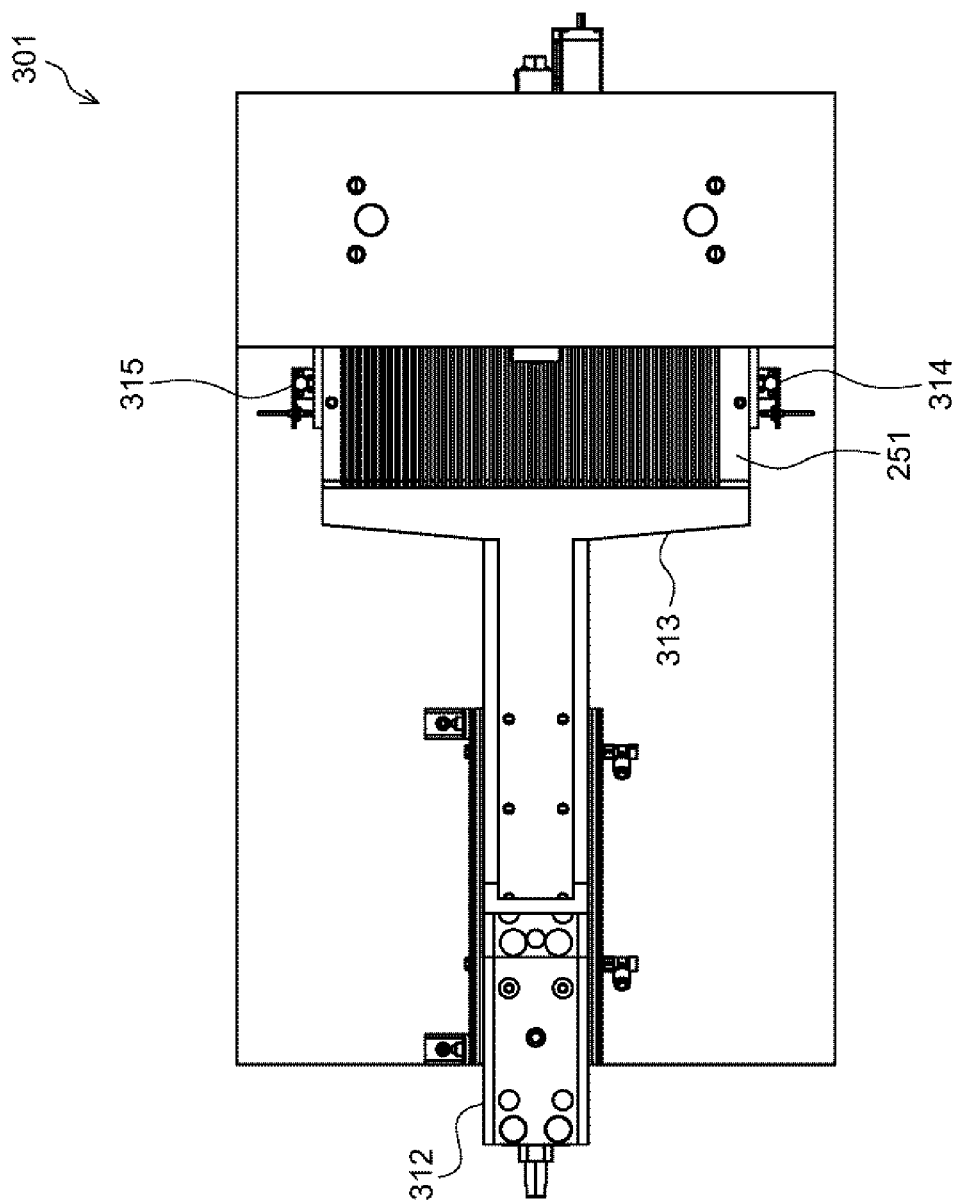
FIG. 13 is a plan view showing a configuration example of the alignment apparatus to which the present technology is applied.
Figure 14:
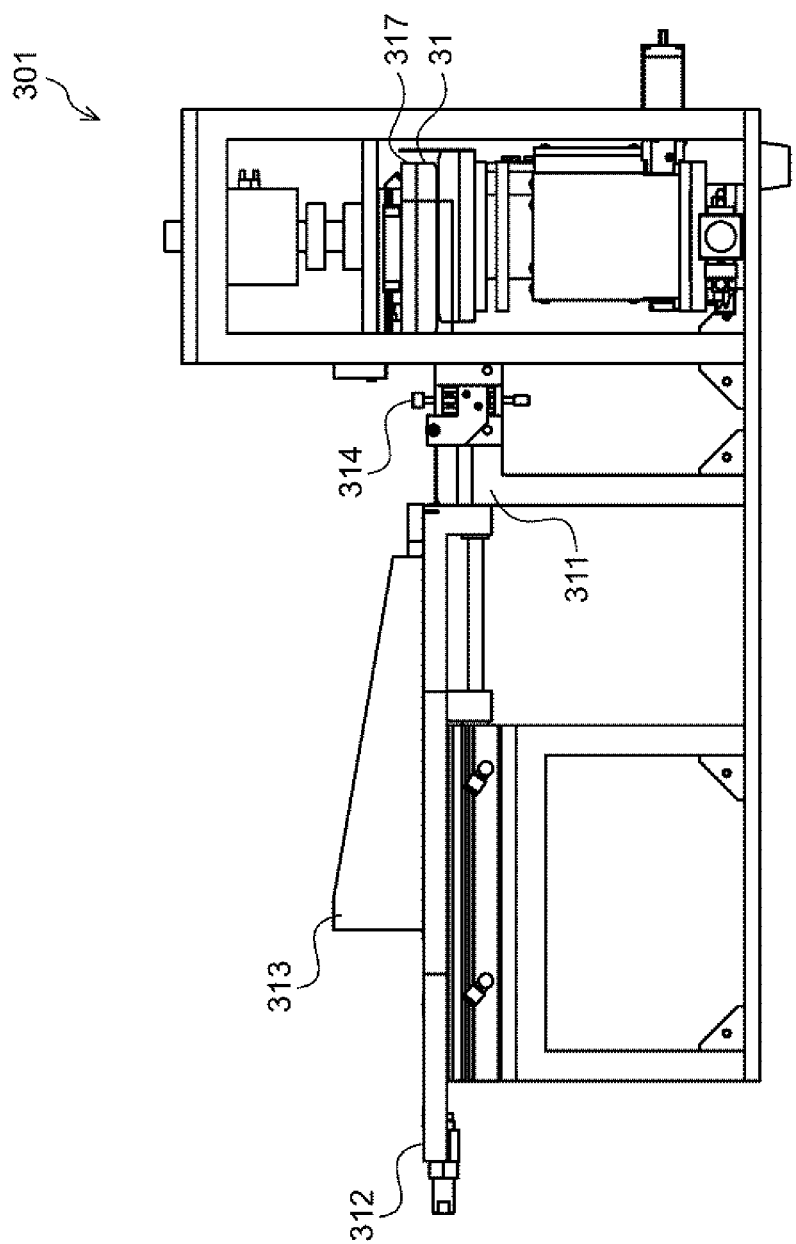
FIG. 14 is a right side view showing a configuration example of the alignment apparatus to which the present technology is applied.

FIG. 12 to FIG. 14 each show a configuration example of the alignment apparatus 301. FIG. 12 is a perspective view of the alignment apparatus 301, FIG. 13 is a plan view of the alignment apparatus 301, and FIG. 14 is a right side view of the alignment apparatus 301. Note that, hereinafter, the right side of FIG. 13 and FIG. 14 is defined as the front of the alignment apparatus 301, and the left side is defined as the rear.

The alignment apparatus 301 includes a stage 311, a slide mechanism 312, a pusher 313, a setting-failure detection sensor 314, a setting-failure detection sensor 315, a guide 316, and a guide 317.

The slide mechanism 312 is coupled to the rear of the stage 311. The pusher 313, which is a pushing mechanism, is installed on the slide mechanism 312 and is capable of sliding in the front-rear direction on the slide mechanism 312.

The palette 251 is installed at the rear end on the stage 311. Further, a set-failure detection sensor 314 and a set-failure detection sensor 315 are installed at the right end and the left end of the position of the stage 311 where the palette 251 is installed. The set-failure detection sensor 314 and the set-failure detection sensor 315 detect the installation error of the palette 251. Further, on the stage 311, the cassette 31 is installed in front of the palette 251 and below the guide 317.

Here, a method of aligning the canes 11 from the palette 251 to the cassette 31 will be described with reference to FIG. 15 and FIG. 16. Note that the left side and the right side of FIG. 15 are respectively the front and the rear of the alignment apparatus 301.

As shown in Part A of FIG. 15, the cassette 31 in the cane-movable state is installed on the stage 311 below the guide 317. The palette 251 is installed at the rear of the cassette 31. The canes 11 are aligned on the palette 251. The guide 316 is disposed above the cane 11 near the distal end of the cane 11.

Then, when the pusher 313 slides forward, the front end of the pusher 313 pushes forward the bottom surfaces of the respective canes 11 aligned on the palette 251. This moves the cane 11 onto the cassette 31, as shown in Part B of FIG. 15. At this time, the guide 316 and the guide 317 prevent the cane 11 from jumping upward.

Figure 15:
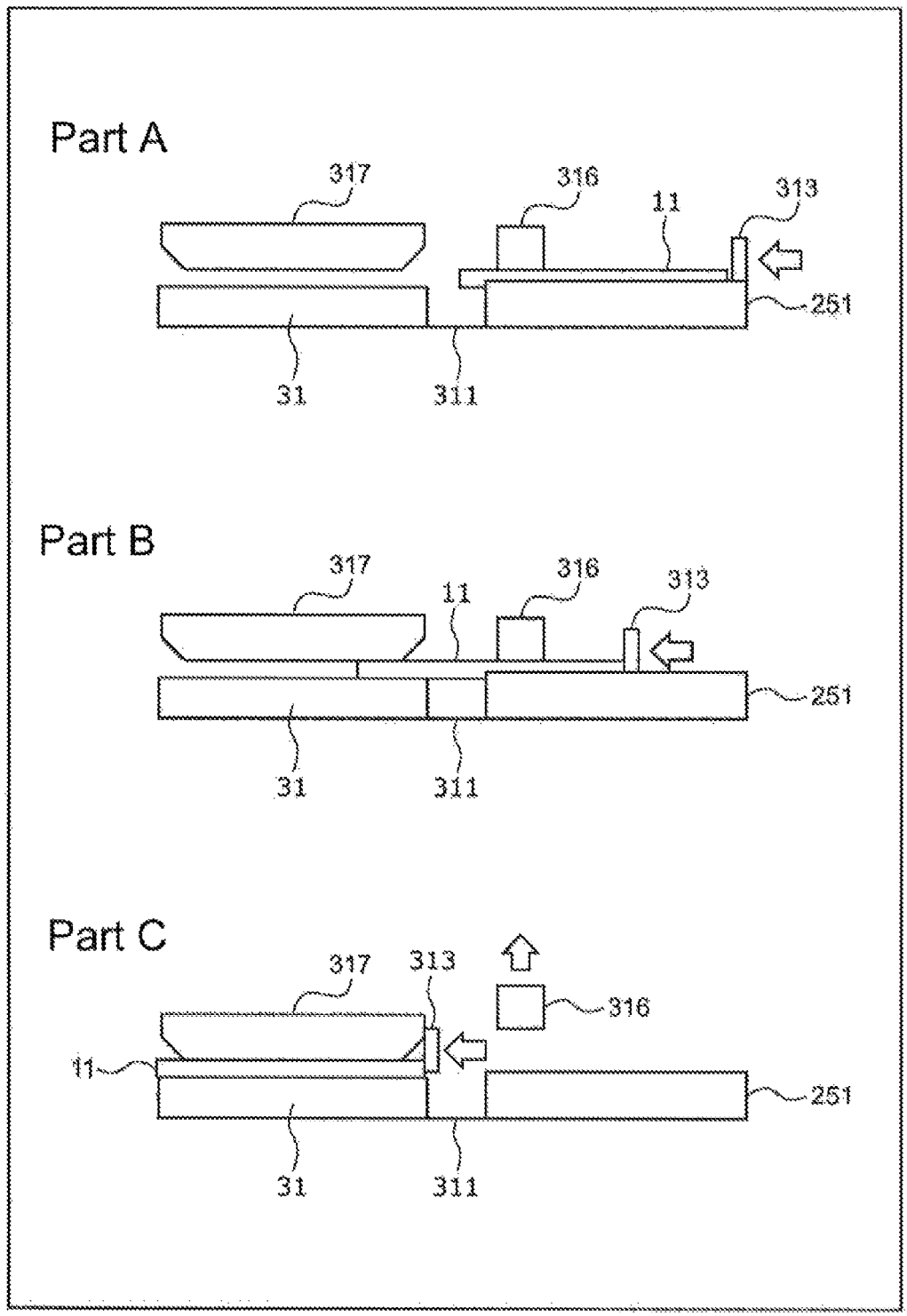
FIG. 15 is a diagram for describing how to align canes from the palette to the cassette.

In addition, as shown in Part C of FIG. 15, the guide 316 moves upward and the pusher 313 pushes forward the bottom surface of the cane 11 until the movement of the cassette 31 is finished.

Figure 16:
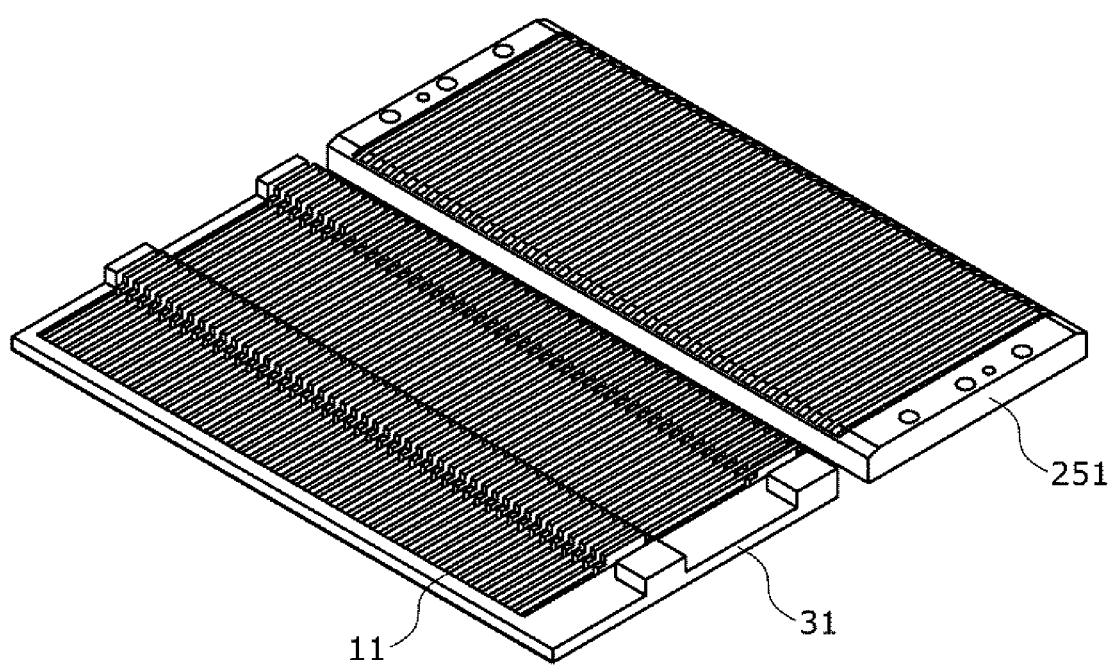
FIG. 16 is a diagram for describing how to align canes from the palette to the cassette.

This causes the plurality of canes 11 to move from the palette 251 to the cassette 31 at a time and the plurality of canes 11 is aligned on the cassette 31, as schematically shown in FIG. 16.

Third Embodiment of Cane Generation and Alignment Step

Next, a third embodiment of the cane generation and alignment step will be described.

First, the above-mentioned draw tower 101 in FIG. 7 is used to generate the cane 11.

Then, although not shown, the plurality of canes 11 is vibrated using a commercially available alignment apparatus and a jig and inserted into the respective insertion holes 41B of the cassette 31, and thus, the canes 11 are aligned in the cassette 31.

Note that, for example, the cane 11 may be manually set in the cassette 31.

With reference to FIG. 6 again, in Step S2, a cleaning step is performed. Specifically, the plurality of canes 11 aligned in the cassette 31 are cleaned at once by a cleaning apparatus 401 shown in FIG. 17.

Figure 17:
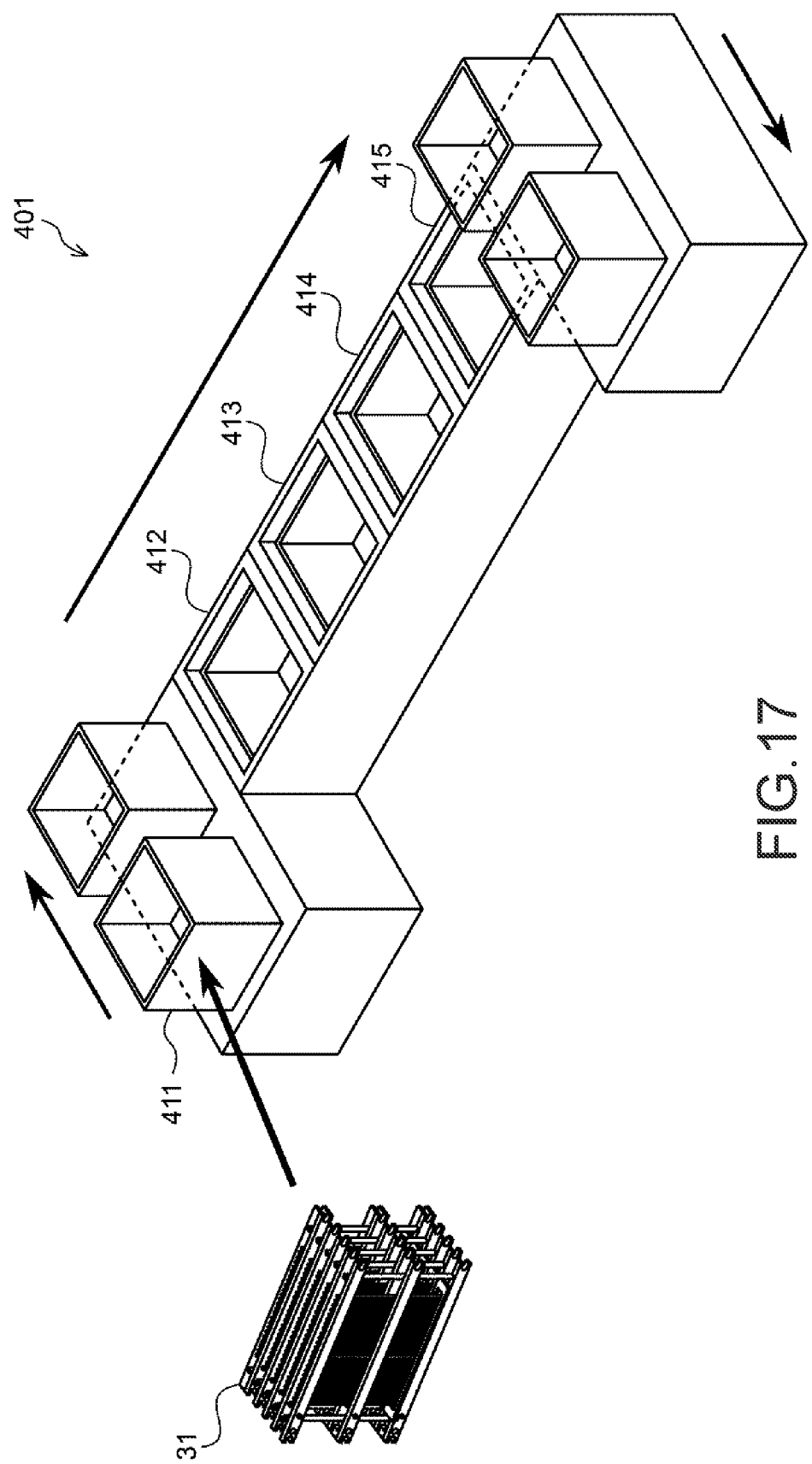
FIG. 17 is a perspective view showing a configuration example of a cleaning apparatus to which the present technology is applied.

FIG. 17 schematically shows a configuration example of the cleaning apparatus 401.

First, a group of cassettes in which the cassettes 31 in which the canes 11 are set are coupled to each other is placed in a box-shaped palette 411 of the cleaning apparatus 401. After that the palette 411 automatically moves in the cleaning apparatus 401, and a redetermined step is performed on the canes 11 set in the cassette group in the palette 411.

Specifically, first, in an ultrasonic cleaning stage 412, ultrasonic cleaning of the canes 11 is performed. Next, in a pre-rinse stage 413, a first rinse of the cleaned canes 11 is performed. Next, in a final rinse stage 414, a second rinse of the canes 11 is performed. Finally, in a dry stage 415, drying of the canes 11 is performed.

After that, the cassette group is automatically unloaded from the palette 411.

As described above, since cleaning, rinsing, and drying of the canes 11 are performed without using a human hand, dust and stains emanating from a person are prevented from adhering to the canes 11.

Further, since the interval between the canes 11 is maintained by the cassette 31, the entire canes 11 can be cleaned cleanly.

Further, since the step of each stage is automatically processed within a predetermined time period, the quality of the cane 11 can be stabilized.

With reference to FIG. 6 again, in Step S3, a packing step is performed.

Figure 18:
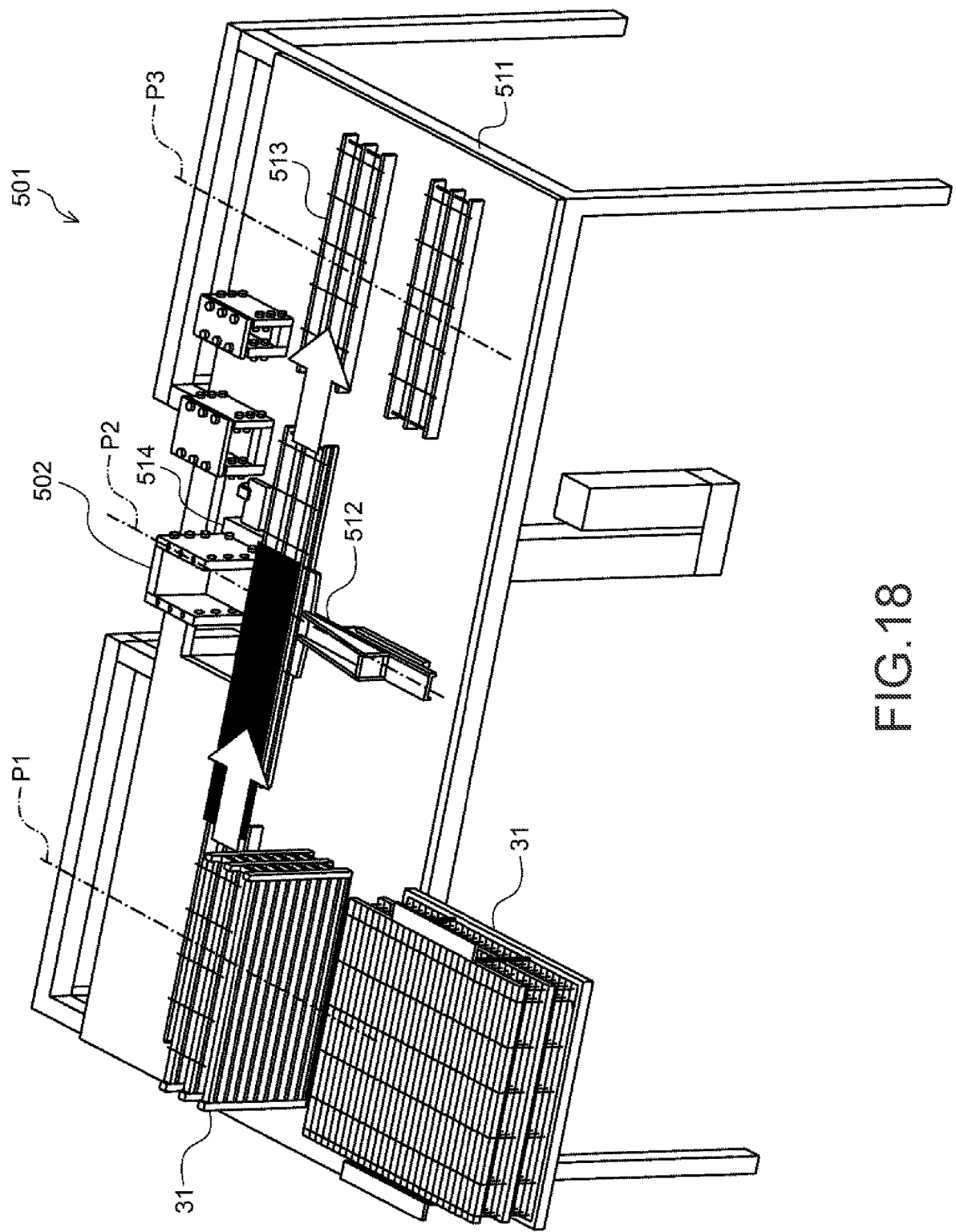
FIG. 18 is a perspective view showing a part of a configuration example of a packing apparatus to which the present technology is applied.

Specifically, a packing apparatus 501 shown in FIG. 18 aligns the canes 11 in a mold 502.

FIG. 18 schematically shows a part of the packing apparatus 501.

The packing apparatus 501 includes a stage 511, a pusher 512, a transport mechanism 513, and a moving mechanism 514.

Although not shown in detail, the packing apparatus 501 has a configuration in which the stage 311 of the alignment apparatus 301 in FIG. 12 to FIG. 14 is replaced with the stage 511. That is, the packing apparatus 501 has a configuration in which a transporting and moving mechanism that includes the stage 511, the transport mechanism 513, and the moving mechanism 514 and an inserting mechanism (including the pusher 512) of the alignment apparatus 301 are combined with each other.

Note that, hereinafter, the back side of the stage 511 in FIG. 18 is defined as the front side of the packing apparatus 501, and the front side of the stage 511 is defined as the rear side of the packing apparatus 501.

The pusher 512, the transport mechanism 513 and the moving mechanism 514 are provided on the stage 511. A cassette group in which a plurality of cassettes 31 in which the canes 11 are set is couplet to each other is aligned a supply position P1 of the stage 511. The cassette group on the front side is erected so that the canes 11 face in the vertical direction. Then, the cassette group is turned sideways so that the canes 11 face in the horizontal direction.

The pusher 512 has a configuration and a functions as those of the pusher 313 of the alignment apparatus 301. The pusher 512 pushes forward the plurality of canes 11 set in the cassette 31 disposed at an insertion position P2 at a time and inserts them into the mold 502.

Note that the mold 502 has a box-like shape in which the top surface and the front surface (surface facing the pusher 512) do not exist.

The transport mechanism 513 extracts the cassette 31 one by one from the cassette group disposed at the supply position P1, and transports it to the insertion position P2. Further, the transport mechanism 513 transports, to an unloading position P3, the empty cassette 31 from which the canes 11 have been inserted into the mold 502, and then unloads the empty the cassette 31 to the outside of the packing apparatus 501.

The mold 502 is placed on the moving mechanism 514. The moving mechanism 514 adjusts the relative position between the cassette 31 disposed at the insertion position P2 and the mold 502 by moving the mold 502 in the up-and-down direction and in the right and left direction.

Figure 19:
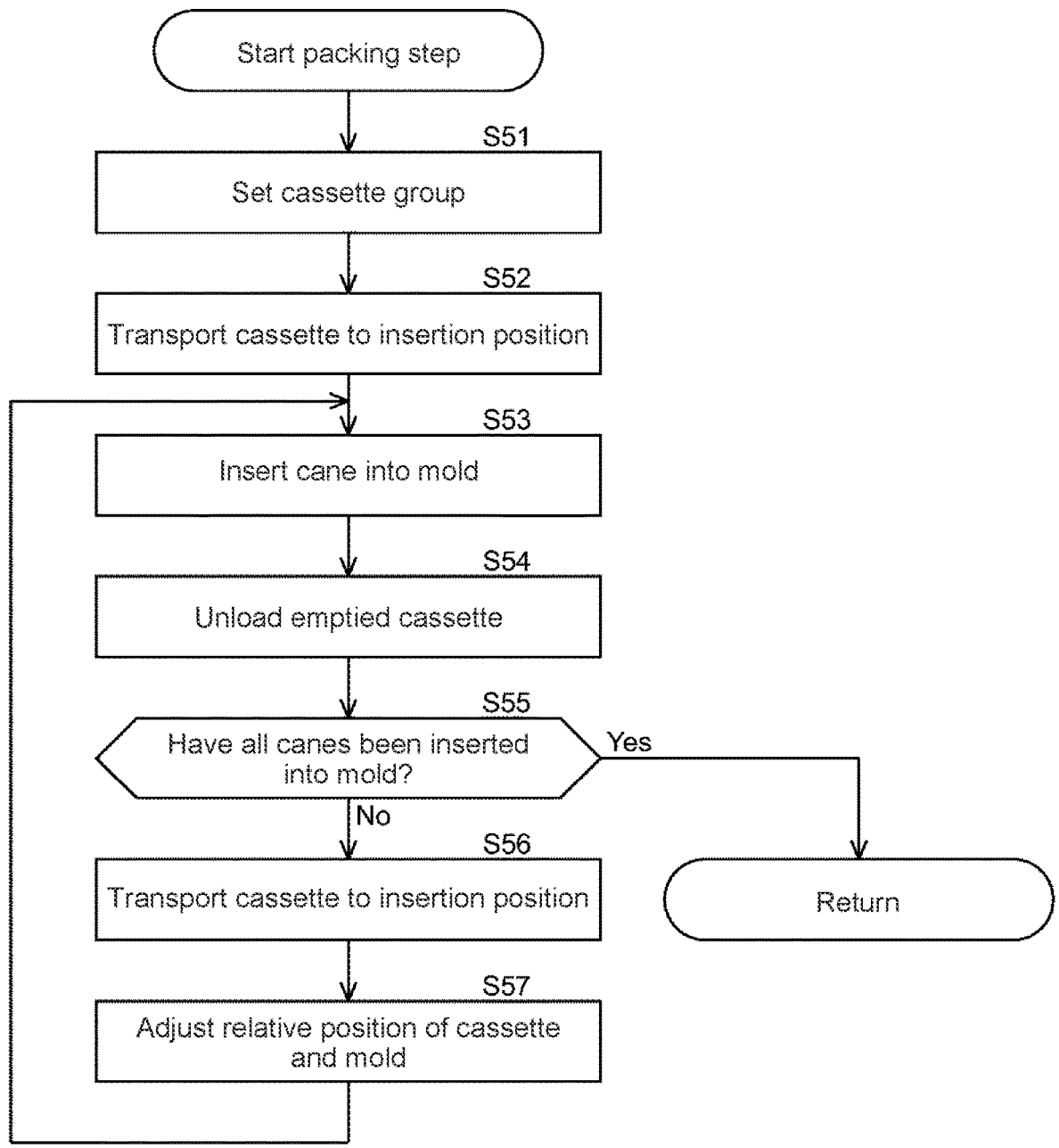
FIG. 19 is a flowchart for describing details of a packing step.

Here, details of the packing step will be described with reference to the flowchart of FIG. 19.

In Step S51, the packing apparatus 501 sets a cassette group. For example, as shown in the front side of FIG. 18, a cassette group in which a plurality of cassettes 31 in which the canes 11 are set is coupled to each other is set vertically on the stage 511 so that the cane 11s face in the vertical direction. The transport mechanism 513 sets a cassette group horizontally at the predetermined supply position P1 of the stage 511 so that the canes 11 face in the horizontal direction.

In Step S52, the transport mechanism 513 transports the cassette 31 to the insertion position P2. Specifically, the transport mechanism 513 extracts one cassette 31 from the cassette group and removes the plate 41A of the support member 41 and the plate 42A of the support member 42 from the extracted cassette 31.

Next, the transport mechanism 513 transports the cassette 31 to the insertion position P2. The transport mechanism 513 causes the cassette 31 to be in a cane-movable state by depressing the movable part 43A of the bottom plate 43 of the cassette 31. As a result, the cassette 31 is disposed in front of the mold 502, and the canes 11 are aligned in parallel to each other and horizontally on the cassette 31 at intervals substantially equal to the width of one cane 11.

In Step S53, the pusher 512 inserts the cane 11 into the mold 502.

Figure 20:
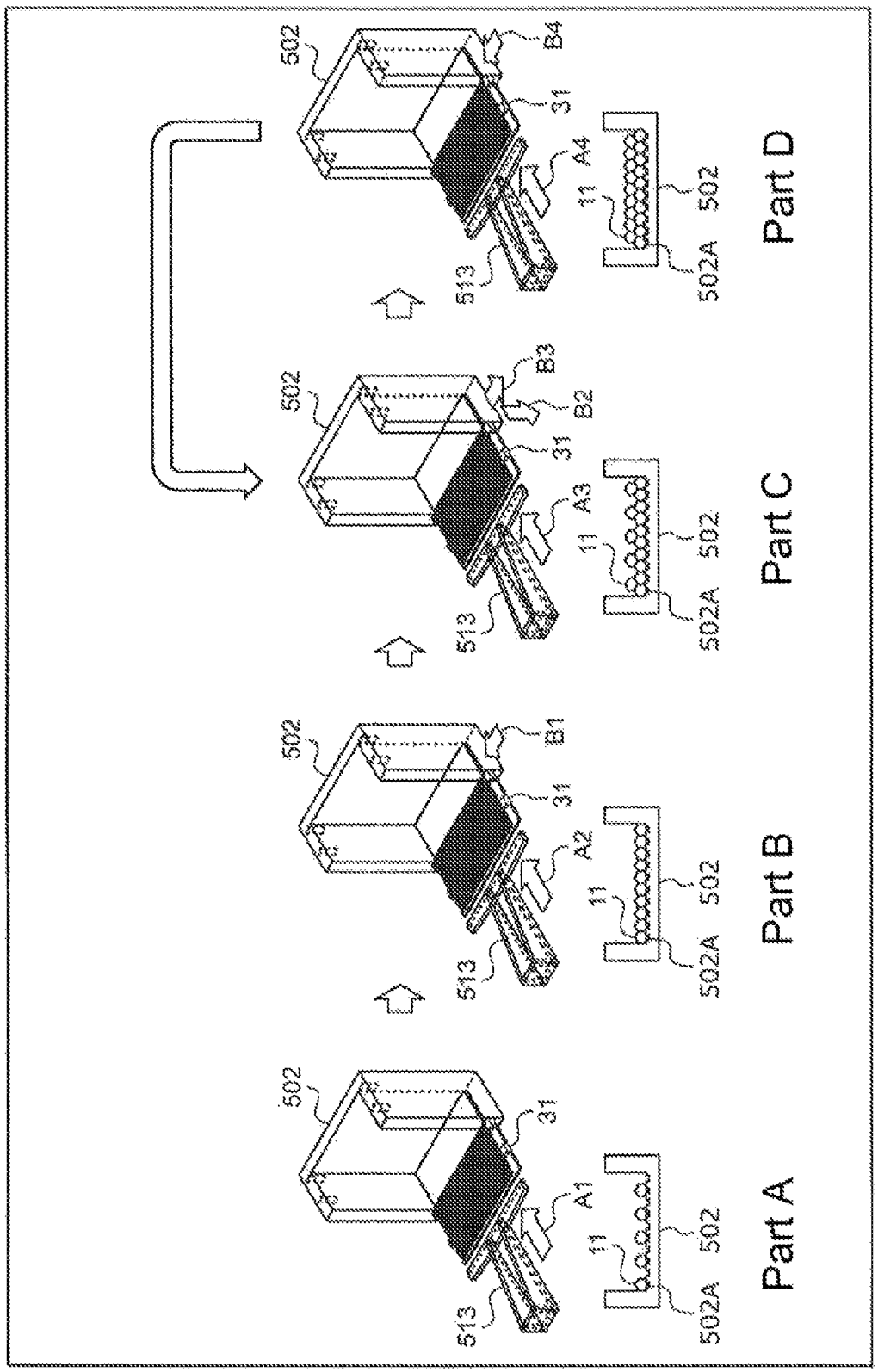
FIG. 20 is a diagram for describing details of the packing step.

Specifically, as shown in Part A of FIG. 20, the pusher 512 slides in the direction of an arrow A1 (to the front), pushes out the respective canes 11 set in the cassette 31, and inserts all the canes 11 into the mold 502.

Here, grooves 502A is formed at predetermined intervals on the bottom surface of the mold 502. The width of the groove 502A is substantially equal to the width W2 (FIG. 1) of the bottom surface of the cane 11. Further, the interval between the adjacent grooves 502A is substantially equal to the width W2 of the bottom surface of the cane 11. Therefore, the canes 11 set in the cassette 31 are each inserted into the groove 502A in the posture shown in Part A of FIG. 2, and are aligned on the bottom surface of the mold 502 at intervals corresponding to one cane 11 (intervals of the widths W2 of the bottom surfaces of the canes 11).

Note that although illustration is omitted, for example, a guide similar to the guide 316 and the guide 317 in FIG. 15 is provided above the cane 11 moving from the cassette 31 to the mold 502, and the cane 11 is prevented from jumping upward.

In Step S54, the transport mechanism 513 unloads the emptied cassette 31. Specifically, the transport mechanism 513 transports the emptied cassette 31 to the unloading position P3, and then unloads the cassette 31 to the outside of the packing apparatus 501.

In Step S55, the transport mechanism 513 determines whether or not all the canes 11 have been inserted into the mold 502. In the case where the cassette 31 still remains at the supply position P1, the transport mechanism 513 determines that all the canes 11 have not yet been inserted into the mold 502, and the process proceeds to Step S56.

In Step S56, the cassette 31 is transported to the insertion position P2, similarly to the process of Step S52.

In Step S57, the moving mechanism 514 adjusts the relative position between the cassette 31 and the mold 502.

Specifically, as shown in Part B of FIG. 20, the moving mechanism 514 moves the mold 502 in the direction of an arrow B1 (in the left direction) by the amount corresponding to one cane 11 (the width W2 of the bottom surface of the cane 11).

After that, the process returns to Step S53, and the processes of Step S53 to Step S57 are repeatedly executed until it is determined in Step S55 that all the canes 11 have been inserted into the mold 502.

For example, as shown in Part B of FIG. 20, the pusher 512 slides in the direction of an arrow A2 (to the front), pushes out the respective canes 11 set in the cassette 31, and inserts all the canes 11 into the mold 502. As a result, in the process of Part A of FIG. 20, the cane 11 is inserted into the gap of the canes 11 aligned on the bottom surface of the mold 502, and the canes 11 are aligned on the bottom surface of the mold 502 without gaps.

Figure 1:
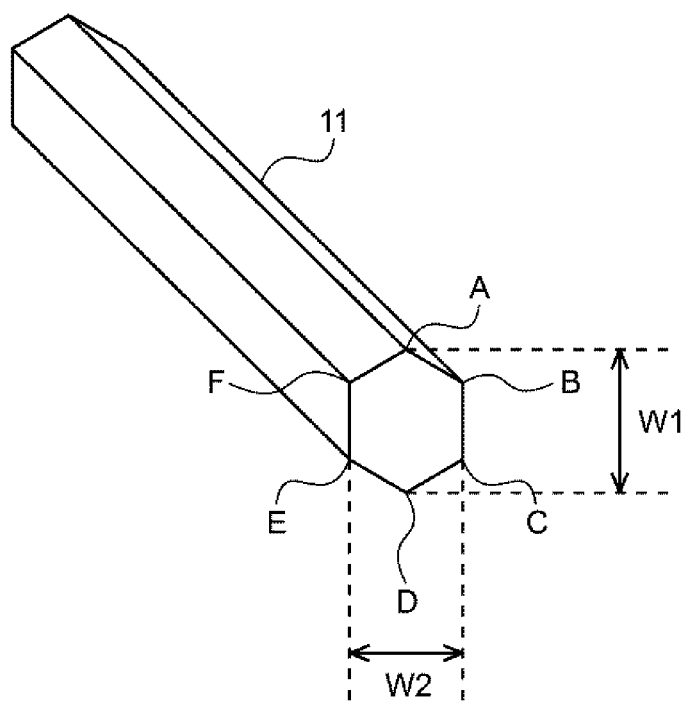
FIG. 1 is a perspective view showing a configuration example of a cane.

Next, for example, as shown in Part C of FIG. 20, the moving mechanism 514 moves the mold 502 in the direction of an arrow B2 (downward direction) by a predetermined height (specifically, by the height between BD of the cane 11 in FIG. 1). Further, the moving mechanism 514 moves the mold 502 in the direction of an arrow B3 (right direction) by the amount corresponding to ½ cane 11 (by ½ of the width W2 of the bottom surface of the cane 11).

Next, the pusher 512 slides in the direction of the arrow A3 (to the front), pushes out the respective canes 11 set in the cassette 31, and inserts all the canes 11 into the mold 502. As a result, the plurality of canes 11 is aligned on the row of the canes 11 in the first row at positions shifted with respect to the row of the canes 11 in the first row by the amount corresponding to ½ cane 11 (½ of the width W2 of the bottom surface of the cane 11) at intervals of one cane 11 (intervals of the width W2 of the bottom surface of the cane 11).

Next, as shown in Part C of FIG. 20, the moving mechanism 514 moves the mold 502 in the direction of the arrow B2 (downward direction) by a predetermined height (specifically, by the height between BD of the cane 11 in FIG. 1). Further, the moving mechanism 514 moves the mold 502 in the direction of the arrow B3 (right direction) by the amount corresponding to ½ cane 11 (½ of the width W2 of the bottom surface of the cane 11).

Next, the pusher 512 slides in the direction of the arrow A3 (to the front), pushes out the respective canes 11 set in the cassette 31, and inserts all the canes 11 into the mold 502. As a result, the canes 11 are aligned on the row of the canes 11 in the first row at positions shifted with respect to the row of the canes 11 in the first row by the amount corresponding to ½ cane 11 (by ½ of the width W2 of the bottom surface of the cane 11) at intervals of one cane 11 (intervals of the width W2 of the bottom surface of the cane 11).

Next, as shown in Part D of FIG. 20, the moving mechanism 514 moves the mold 502 in the direction of an arrow B4 (left direction) by one cane 11 (the width W2 of the bottom surface of the cane 11).

Next, as shown in Part D of FIG. 20, the pusher 512 slides in the direction of an arrow A4 (to the front), pushes out the respective canes 11 set in the cassette 31, and inserts all the canes 11 into the mold 502. As a result, in the process shown in Part C in FIG. 20, the cane 11 is inserted into the gap of the canes 11 aligned in the second row of the mold 502, and the canes 11 are aligned without gaps in the second row of the mold 502. After that, the processes shown in Parts C and D of FIG. 2 are repeated until it is determined that all the canes 11 have been inserted into the mold 502.

Note that in the process of Part C of FIG. 20, before aligning the canes 11 in the odd-numbered row, the moving mechanism 514 moves the mold 502 in the direction of the arrow B3 (right direction) by the amount corresponding to ³⁄₂ Cane 11 (by ³⁄₂ of the width W2 of the bottom surface of the cane 11). Meanwhile, in the process of Part C of FIG. 20, before aligning the canes 11 in the even-numbered row, the moving mechanism 514 moves the mold 502 in the direction of the arrow B3 (right direction) by the amount corresponding to ½ cane 11 (by ½ of the width W2 of the bottom surface of the cane 11).

Figure 21:
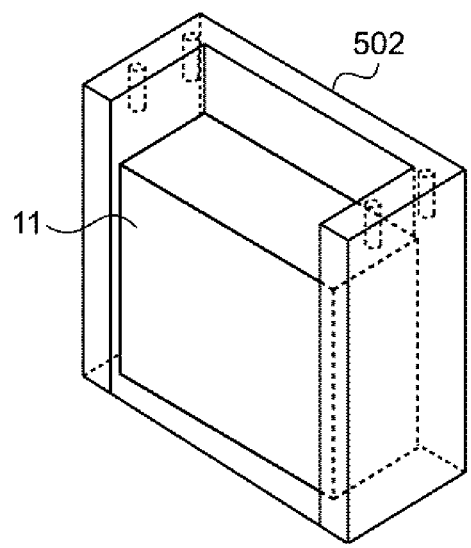
FIG. 21 is a diagram for describing details of the packing step.

As a result, the rows of the canes 11 are stacked in the mold 502 in order from the bottom. Then, as schematically shown in FIG. 21, a rectangular parallelepiped mass of the canes 11 aligned in a honeycomb pattern is formed in the mold 502.

Meanwhile, in the case where it is determined in Step S55 that all the canes 11 have been inserted into the mold 502, the packing steps ends.

As described above, since a large number of canes 11 are automatically inserted into the mold 502 collectively and aligned, the productivity is improved and the process time is shortened. Further, insertion errors such as insertion of the cane 11 in a different posture are prevented. In addition, since there is no manual work, dust and stains emanating from a person are prevented from adhering to the cane 11.

With reference to FIG. 6 again, in Step S4, an ingot-generating step is performed. Specifically, the mold 502 in which the canes 11 are aligned is placed in a furnace (not shown), and the canes 11 are melted. As a result, an ingot that is a rectangular parallelepiped optical part is generated.

After that the process of producing an optical member ends.

Note that the generated ingot is used for producing an LGP.

As described above, the production of the canes 11 and the ingot is automated, and the canes 11 are cleaned while being apart from each other at predetermined intervals in the cassette 31, thereby improving the productivity and the quality of the canes 11 and the ingot. This improves the quality of LGPs using ingots.

2. Modified Example

A modified example of the embodiment of the present technology will be described.

For example, the shape of the bottom surface of the cane may be a shape other than a hexagonal as long as the canes can be aligned without gaps as in the above-mentioned cane 11. For example, the bottom surface of the cane may have a rectangular shape, an isosceles triangle shape, or the like.

Further, for example, in the case where it is unnecessary to align the canes without gaps, for example, the shape of the bottom surface of the cane may be a circular, a regular octagon, or the like.

In the above description, an example in which the cassette 31 includes two support member of the support member 41 and the support member 42 in addition to the bottom plate 43 has been shown, but the number of support members can be changed. For example, the number of support members other than the bottom plate 43 can be one or three or more.

In the above description, an example in which the mold 502 is moved in order to adjust the relative position between the cassette 31 and the mold 502 in the packing step has been shown, but the cassette 31 may be moved or both the cassette 31 and the mold 502 may be moved.

Further, the present technology can be applied also in the case of using the cane for applications other than LGPs.

3. Others

The embodiment of the present technology is not limited to the embodiment described above, and various modifications can be made without departing from the essence of the present technology.

In addition, the effects described herein are merely illustrative and not restrictive, and there may be other effects than those described herein.

Note that the present technology may also take the following configurations.

(1) A method of producing an optical member, including:
an alignment step of inserting, by an alignment apparatus, one columnar cane into each of a plurality of insertion holes of a jig, the plurality of insertion holes being aligned at predetermined intervals in a first direction and extending in a second direction perpendicular to the first direction, the jig holding the respective canes inserted into the plurality of insertion holes;
a cleaning step of cleaning, by a cleaning apparatus, the respective canes aligned in the jig; and
a packing step of repeatedly performing, by a packing apparatus, a process of inserting the cleaned cane into a mold from the jig and aligning the canes in the mold in a horizontal direction and a vertical direction.

(2) The method of producing an optical member according to (1), in which
the alignment apparatus moves the cane to a position of the insertion hole while gripping the cane, and inserts the cane into the insertion hole.

(3) The method of producing an optical member according to (2), in which
the alignment apparatus grips a columnar member that is a source of the cane and cuts the member at a predetermined length to generate the cane.

(4) The method of producing an optical member according to any one of (1) to (3), in which
a bottom surface of the cane is a hexagon whose inner angles are all equal in size, one set of sides of three sets of sides of the bottom surface parallel to each other being longer than the other two sets of sides, and
the alignment apparatus aligns directions of inserting the canes into the insertion holes in a circumferential direction of each of the canes.

(5) The method of producing an optical member according to any one of (1) to (4), in which
the packing apparatus moves at least one of the jig or the mold, adjusts a relative position between the jig and the mold, pushes out the respective canes horizontally aligned in the jig at a time, and inserts the canes into the mold.

(6) The method of producing an optical member according to (5), in which
an interval between the insertion holes is substantially equal to a width of the cane, and
the packing apparatus inserts the canes into the mold at intervals corresponding to one cane.

(7) The method of producing an optical member according to (6) in which
a bottom surface of the cane is a hexagon whose inner angles are all equal in size, and
the packing apparatus stacks the canes in a honeycomb pattern in the mold.

(8) The method of producing an optical member according to any one of (1) to (7), in which
the jig includes
a first support member that supports a side surface of each of the canes inserted into the respective insertion holes, the plurality of insertion holes being formed in the first support member, and
a second support member that supports a bottom surface of each of the canes passing through the respective insertion holes.

(9) The method of producing an optical member according to (8), in which
the packing apparatus inserts the respective canes into the mold by pushing out the canes in a longitudinal direction, removal of a part of the first support member of the jig exposing a part of a side surface of the cane from the insertion hole, deformation of the second support member exposing at least a part of the bottom surface of the cane.

(10) A jig, including:
a first support member in which a plurality of insertion holes that is aligned at predetermined intervals in a first direction and extends in a second direction perpendicular to the first direction is formed, the first support member supporting a side surface of a columnar cane inserted into each of the insertion holes; and a second support member that supports a bottom surface of each of the canes passing through the respective insertion hole.

(11) The jig according to (10), in which at least a part of a surface of the second support member supporting the bottom surface of the cane is meshed.

(12) The jig according to (10) or (11), in which removal of a part of the first support member exposes a part of a side surface of the cane from the insertion hole, and deformation of the second support member exposes at least a part of the bottom surface of the cane.

(13) The jig according to any one of (10) to (12), in which the insertion hole is tapered as advancing in an insertion direction of the cane.

(14) The jig according to (13), in which each of a width in the first direction of a terminal opening that is an opening of a terminal of the insertion hole in the insertion direction and an interval between adjacent insertion holes is substantially equal to a width in the first direction of the cane inserted into the insertion hole.

(15) The jig according to (14), in which a width of the terminal opening in a third direction perpendicular to the first direction is substantially equal to a width in the third direction of the cane inserted into the insertion hole.

(16) The jig according to (15), in which the width of the cane in the first direction and the width in the third direction differ from each other.

(17) The jig according to (16), in which a bottom surface of the cane is a hexagon whose inner angles are all equal in size, one set of sides of three sets of sides of the bottom surface parallel to each other being longer than the other two sets of sides.

(18) An alignment apparatus, including:

a gripping mechanism that grips a columnar cane;

a moving mechanism that moves the gripping mechanism; and a holding mechanism that holds a jig holding the canes inserted one by one into a plurality of insertion holes of the jig, the plurality of insertion holes being aligned at predetermined intervals in a first direction and extending in a second direction perpendicular to the first direction, in which the moving mechanism moves the gripping mechanism and moves the cane to a position of the insertion hole of the jig, and the gripping mechanism inserts the cane into the insertion hole.

(18a) The alignment apparatus according to (18) above, in which the gripping mechanism grips a columnar member that is a source of the cane and cuts the member at a predetermined length to generate the cane.

(18b) The alignment apparatus according to (18) or (18a) above, in which the holding mechanism is capable of moving the jig in a predetermined direction, and moves the jig in accordance with movement of the cane by the moving mechanism.

(18c) The alignment apparatus according to (18) or (18b) above, in which a bottom surface of the cane is a hexagon whose inner angles are all equal in size, one set of sides of three sets of sides of the bottom surface parallel to each other being longer than the other two sets of sides, and the gripping mechanism aligns directions of inserting the canes into the insertion holes in a circumferential direction of each of the canes.

(19) A packing apparatus, including:

a moving mechanism that moves at least one of a jig or a mold and adjusts a relative position between the jig and the mold, a plurality of columnar canes being horizontally aligned in parallel with each other at intervals substantially equal to a width of the cane; and a pushing mechanism that pushes out the plurality of canes aligned in the jig at a time and inserts the canes into the mold at intervals of one cane, in which the canes are aligned in the mold in a horizontal direction and a vertical direction by repeating a process of inserting the plurality of canes into the mold from the jig for a plurality of the jigs by the pushing mechanism while adjusting the relative position between the jig and the mold by the moving mechanism.

(19a) The packing apparatus according to (19) above, in which a bottom surface of the cane is a hexagon whose inner angles are all equal in size, and the moving mechanism and the pushing mechanism are used to stack the canes in a honeycomb pattern in the mold.

(19b) The packing apparatus according to (19) or (19a) above, further including a transport mechanism that transports the jig to a front of the mold and transports the jig emptied by the cane being inserted into the mold from the front of the mold to another position.

It should be understood by those skilled in the art that various modifications, combinations, sub-combinations and alterations may occur depending on design requirements and other factors insofar as they are within the scope of the appended claims or the equivalents thereof.

What is claimed is:

1. A method of producing an optical member, comprising: an alignment step of inserting, by an alignment apparatus, one cane into each of a plurality of insertion holes of a jig that is not a part of the optical member, the plurality of insertion holes being aligned at predetermined intervals in a first direction and extending in a second direction perpendicular to the first direction, the jig holding the respective canes inserted into the plurality of insertion holes; a cleaning step of cleaning, by a cleaning apparatus, the respective canes aligned in the jig; and a packing step of repeatedly performing, by a packing apparatus, a process of inserting the cleaned cane into a mold from the jig, which includes removing the cleaned cane from the jig, and aligning the canes in the mold in a horizonal direction and a vertical direction prior to forming the optical member from the canes.

2. The method of producing an optical member according to claim 1, wherein the alignment apparatus moves the cane to a position of the insertion hole while gripping the cane, and inserts the cane into the insertion hole.

3. The method of producing an optical member according to claim 2, wherein the alignment apparatus grips a columnar member that is a source of the cane and cuts the member at a predetermined length to generate the cane.

4. The method of producing an optical member according to claim 1, wherein
   a bottom surface of the cane is a hexagon whose inner angles are all equal in size, one set of sides of three sets of sides of the bottom surface parallel to each other being longer than the other two sets of sides, and
   the alignment apparatus aligns directions of inserting the canes into the insertion holes in a circumferential direction of each of the canes.

5. The method of producing an optical member according to claim 1, wherein
   the packing apparatus moves at least one of the jig or the mold, adjusts a relative position between the jig and the mold, pushes out the respective canes horizontally aligned in the jig at a time, and inserts the canes into the mold.

6. The method of producing an optical member according to claim 5, wherein
   an interval between the insertion holes is substantially equal to a width of the cane, and
   the packing apparatus inserts the canes into the mold at intervals corresponding to one cane.

7. The method of producing an optical member according to claim 6, wherein
   a bottom surface of the cane is a hexagon whose inner angles are all equal in size, and
   the packing apparatus stacks the canes in a honeycomb pattern in the mold.

8. The method of producing an optical member according to claim 1, wherein
   the jig includes
      a first support member that supports a side surface of each of the canes inserted into the respective insertion holes, the plurality of insertion holes being formed in the first support member, and
      a second support member that supports a bottom surface of each of the canes passing through the respective insertion holes.

9. The method of producing an optical member according to claim 8, wherein
   the packing apparatus inserts the respective canes into the mold by pushing out the canes in a longitudinal direction, removal of a part of the first support member of the jig exposing a part of a side surface of the cane from the insertion hole, deformation of the second support member exposing at least a part of the bottom surface of the cane.

* * * * *